(12) United States Patent
Page

(10) Patent No.: US 6,204,947 B1
(45) Date of Patent: Mar. 20, 2001

(54) MULTI-STAGE OPTICAL COMMUTATOR

(76) Inventor: Derrick J Page, 1645 Severn Chapel Rd., Crownsville, MD (US) 21032

( * ) Notice: Subject to any disclaimer, the term of this patent is extended or adjusted under 35 U.S.C. 154(b) by 0 days.

(21) Appl. No.: 09/032,937

(22) Filed: Mar. 2, 1998

(51) Int. Cl.[7] .................................................. H04B 10/00
(52) U.S. Cl. ..................... 359/145; 359/140; 359/173; 250/227.12; 342/375
(58) Field of Search .................................. 359/145, 140, 359/173; 250/227.12; 342/375

(56) References Cited

U.S. PATENT DOCUMENTS

| | | | |
|---|---|---|---|
| 4,028,702 | * | 6/1977 | Levine ................................... 342/374 |
| 5,325,102 | * | 6/1994 | Page ...................................... 342/375 |
| 5,347,288 | * | 9/1994 | Page ...................................... 342/375 |
| 5,856,805 | * | 1/1999 | Page ...................................... 342/375 |
| 5,923,291 | * | 7/1999 | Page ...................................... 342/375 |
| 6,002,365 | * | 12/1999 | Page ...................................... 342/375 |

* cited by examiner

Primary Examiner—Kinfe-Michael Negash
(74) Attorney, Agent, or Firm—H.C. Lin Patent Agent

(57) ABSTRACT

An array antenna is steered by moving two sets of optical fibers of different optical lengths between a number of light signal sources and an array antenna. By changing the lengths of the optical paths of the different light signal sources, the wave front can be steered. The light signal traverses five sections of optical delay lines with at least two selectable optical lengths. One set of selectable optical lengths provides coarse adjustment of steering, and a second set of selectable optical lengths provides fine adjustment of steering. The coarse adjustment is implemented by using a larger increment of selectable optical lengths between adjacent optical lengths than the increment for the fine adjustment. The antenna can serve both for a transmitter or a receiver.

34 Claims, 4 Drawing Sheets

MULTI-STAGE OPTICAL COMMUTATOR

BACKGROUND OF THE INVENTION

1. Field of the Invention

This invention relates to array antennas and is particularly concerned with providing time delay steering to array antenna elements. This application is a co-pending U.S. patent application Ser. No. 09/017,099, filed Feb. 2, 1998.

2. Description of the Prior Art

An array antenna consists of a group of antenna elements uniformly spaced apart to form an array. The array can be used for transmitting a beam of microwave energy in a chosen direction or receiving a microwave signal from a particular direction. This beam steering is achieved by controlling the relative timing or phasing of the individual elements.

The most common means of steering a beam in an antenna array is to control the relative phase of the signal of the elements. For the case of a flat antenna array, if all the elements are operated in unison, the beam will be pointed in the boresight direction, which is the direction perpendicular to the plane of the array. If a linearly increasing phase shift is introduced across the face of the array, the beam will be deflected at some angle from the boresight direction. Such antenna systems, referred to as phased arrays, are employed in applications where it is required to steer the beam rapidly in space and where the use of parabolic dish antennas is not practical.

Controlling the relative phase of each of the antenna elements requires that each element contains a phase shifting device and that an electronic control system be used to control the phase of each of the elements. However, the wide scale use of phased arrays has been limited by the high cost of their complex circuitry. Furthermore, if the phase shifting circuit is adjusted to steer in a particular direction, this setting will only be valid for a particular frequency. Adjacent frequencies will be transmitted or received with directional errors, a phenomena known as "squint". Therefore, known phase shifting techniques impose a limit on the frequency range of operation.

Another technique that is used to steer the beam in an array antenna is to control the relative timing of the transmitted or received signal at the array element. In the transmission mode, if the signal at each of the elements is emitted in unison, a wavefront is formed that is parallel to the plane of the array. The signal beam is directed perpendicular to the wavefront, therefore, when the signal is emitted from the antenna elements in unison, the beam is directed perpendicular to the plane of the array (the boresight direction). When the emission from the antenna elements is not in unison, but is varied in time along the array, the angle of the wavefront relative to the plane of the array changes and the beam is steered away from boresight. If, for example, the signal emission from any element relative to its nearest adjacent element is delayed a time t and each element is spaced a distance d apart, the steered angle $\phi$ between the boresight direction and the beam direction is given by the formula $\sin \phi = tc/d$, where c represents the velocity of electromagnetic propagation in space. True-time delay techniques allow antenna arrays to operate over extremely wide frequency ranges as the delay techniques are frequency independent.

The use of fiberoptic communication systems is known. A commercially available laser unit is used to convert a microwave signal to an amplitude modulated optical signal. The optical signal travels through the optical fiber to where it is converted back to a microwave signal by an optical detector and a microwave amplifier, which are commercially available.

Optical techniques have been suggested to control array elements. Schemes have been proposed to use a selection of optical fibers with lengths arranged in a binary or quadratic sequence and to switch in a series string combination to achieve a desired timing. This would result in a very complex control scheme employing thousands of optical fibers and optical switches for even the simplest array.

An optical commutator scheme using two sets of fiber optics, each having a parabolic distribution of lengths has been described in U.S. Pat. No. 5,347,288. By aligning these two sets of fibers and moving one set relative to the other, a linear and variable set of delay paths can be generated which can be incorporated into an antenna array to provide the timing needed to form and steer the beam. The optical commutator uses far fewer optical delay lines than any other scheme known. However, the optical commutator must employ a large number of fibers if it is required to steer the antenna array with great precision and to be able to adjust the pointing direction in small fractions of a degree.

SUMMARY OF THE INVENTION

An object of the present invention is to provide a device that performs the steering and timing function for an antenna array. Another object of the present invention is to provide an array antenna which can be steered with great precision. Still another object of this invention is to provide coarse and fine steering adjustment.

In this invention, the timing scheme for a particular array antenna design is 'hard wired' by having two sets of optical fiber delay lines each built into a separate movable element. The optical fiber delay lines of the first movable element are of selected lengths that vary over a wide range and have first ends which are alignable to a set of input optical fibers. The input fibers are fed from one or more amplitude modulated light sources representing the signals of the antenna elements. The second ends of the optical fibers are alignable to a set of output fibers of selected lengths. These output fibers are connected to a second set of input fibers that in turn are alignable to the firs tends of a second set of fibers mounted on a second movable element. These movable fibers are of selected lengths that vary over a fine range and have second ends that are alignable to a second set of output fibers having selected lengths.

The second output optical delay lines are connected to one or more optical detectors that are capable of converting the optical modulated signal into an RF signal. The two movable sets of optical fibers and the three sets of stationary optical fibers together with the associated mechanism and components are referred here as a "multi-stage optical commutator".

In the case of a transmitter, the parallel signals are fed to the respective radiating elements in an array. In the case of a receiver, the signal is combined with other parallel signals from other receiving elements to form the composite received signal.

As the first and second movable elements are moved, each of the parallel signals is transmitted through a selected optical delay path to the radiating element in the case of a transmitter. In the case of a receiver, signals from the antenna elements are passed through various parallel delay paths and then combined. By controlling the amount of time delay for each antenna element, a beam may be formed and steered.

Moving the first movable element causes the beam to steer in large, coarse increments in space. Moving the second movable element causes the beam to steer in fine increments in space.

Other objects and advantages of the invention will become apparent from the description of certain present preferred embodiments thereof shown in the drawings.

DETAILED DESCRIPTION OF THE PREFERRED EMBODIMENT

Figure 1:
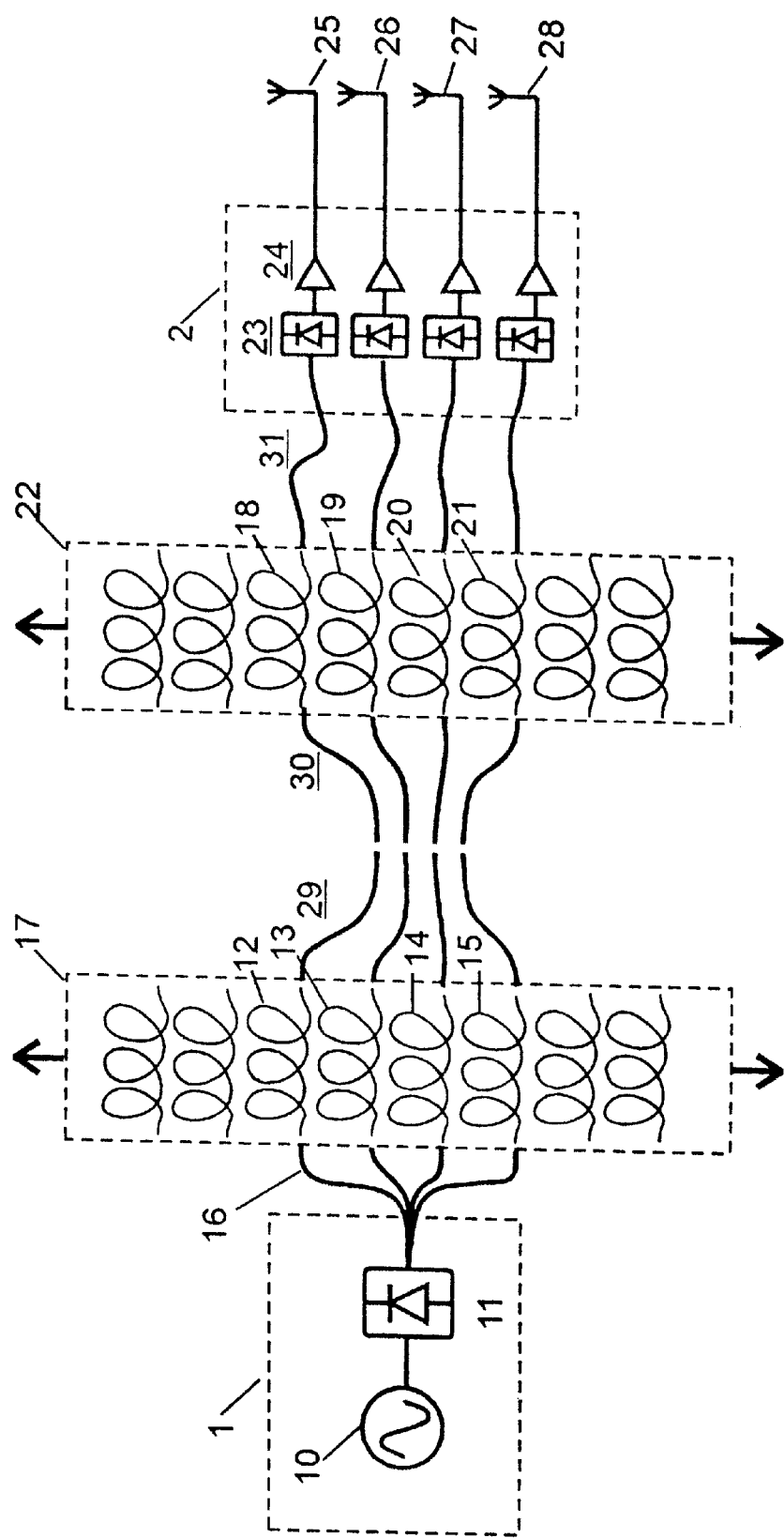
FIG. 1 is a schematic diagram showing a two-stage optical commutator used to steer the beam being transmitted from an antenna array.

Referring to FIG. 1 which shows a circuit schematic of the two-stage optical commutator used to steer the radiated beam from an antenna array. The frequency to be transmitted is generated by frequency source 10. This signal is used to modulate the amplitude of light given off by light source 11, which is preferably a laser diode. The combination of requirency source and light source is referred to as the first electronic unit 1. The amplitude modulated light is then split into many parallel paths in a group of input optical fibers 16, which are of selected lengths. The light then passes through a movable set of optical fibers 17 which are of selected lengths (as indicated by the arrowheads). Some of this group of optical fibers are unused for a particular setting. Optical fibers 12, 13, 14 and 15 pass the light to a group of output optical fibers 29. The light then passes to the input fibers, 30 of the second stage of the commutator. The light then passes through fibers 18, 19, 20 and 21 of movable group 22 (as indicated by the arrowheads). The light then passes though output fibers 31 to respective optical detectors 23 which converts the amplitude modulated light into RF signals. Amplifiers 24 amplify the respective parallel signals and feed them to antenna array radiating elements 25, 26, 27 and 28. The collection of detectors and amplifiers, 2, is referred to as the second electronic unit.

Figure 2:
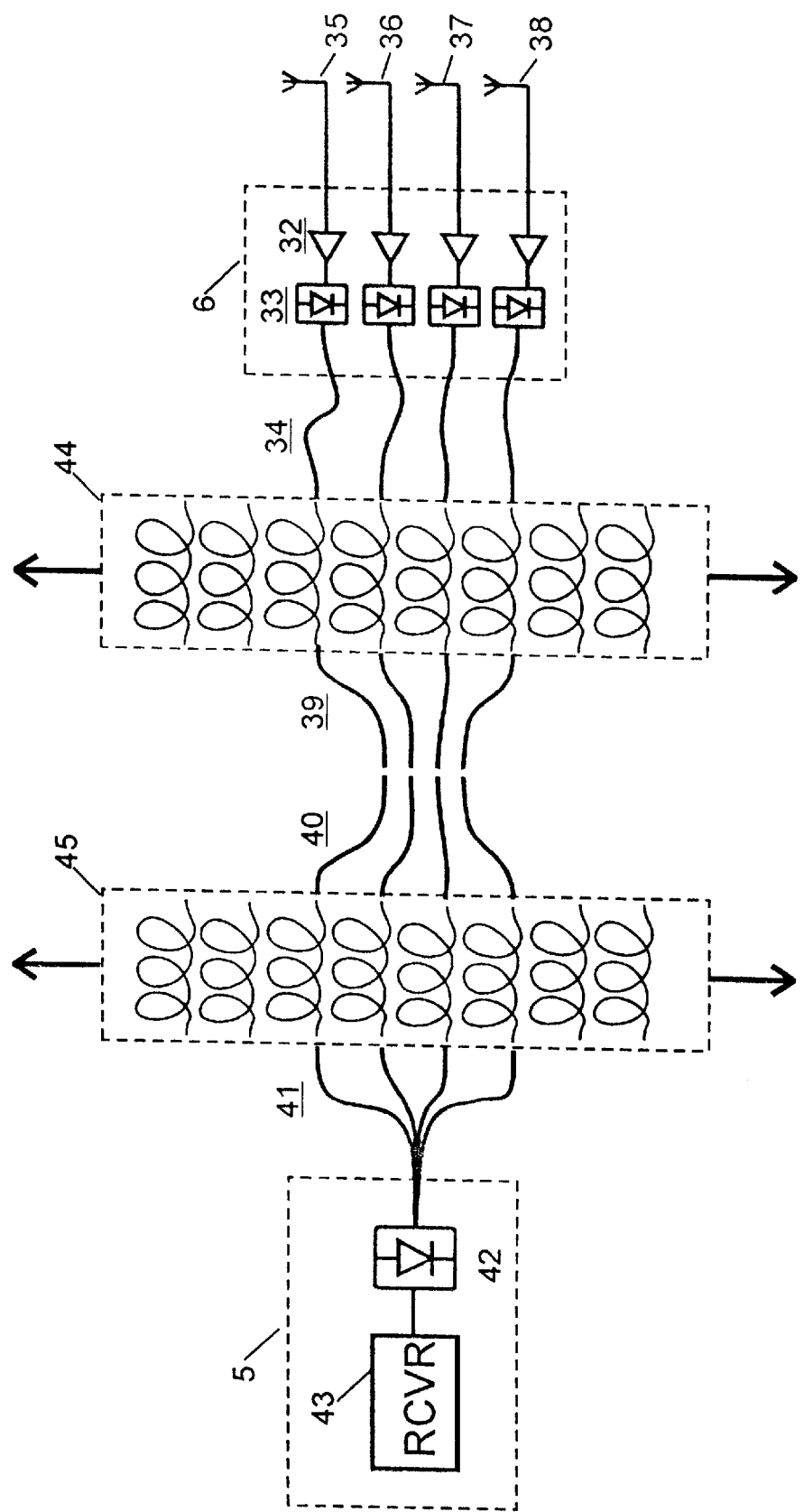
FIG. 2 is a schematic diagram showing a two-stage optical commutator being used in a array antenna receiver.

A similar arrangement is used in the schematic receiver circuit shown in FIG. 2. Here the received signals picked up by antenna elements 35, 36, 37 and 38 are amplified by respective amplifiers 32 and converted to amplitude modulated light by light sources 33, preferable laser diodes. The combination of amplifiers and light source 6 is similar to the function of the first electronic unit in FIG. 1. The light then passes through input fibers 34, having selected lengths to movable fibers 30 also having selected lengths. After passing through the movable fibers, the light passes through output optical fibers 39 having selected lengths. From there the light passes through input optical fibers 40 of the second stage of the optical commutator to movable optical fiber set 31 of selected lengths. After passing through the second set of movable fibers the light passes through output optical fiber set 41, having selected lengths. The light is then combined and fed to optical detector 42, which produces a RF replica of the composite optical signal from all the parallel paths. This RF signal is then sent to the receiver unit 43. The combination of the optical detector and receiver unit 5 is similar to the function of the second electronic unit of FIG. 1.

Figure 4:
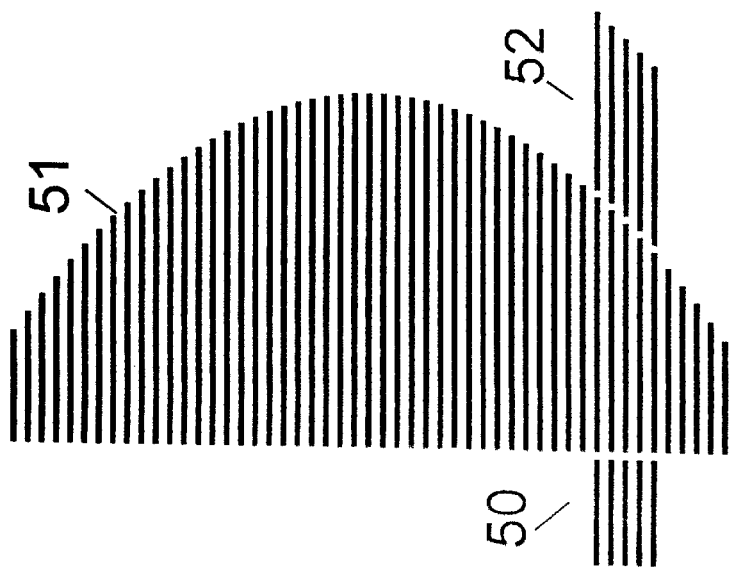
FIG. 4 is a histogram showing the relative lengths of the optical fibers used for a single stage optical commutator set in the steer right position.
Figure 3:
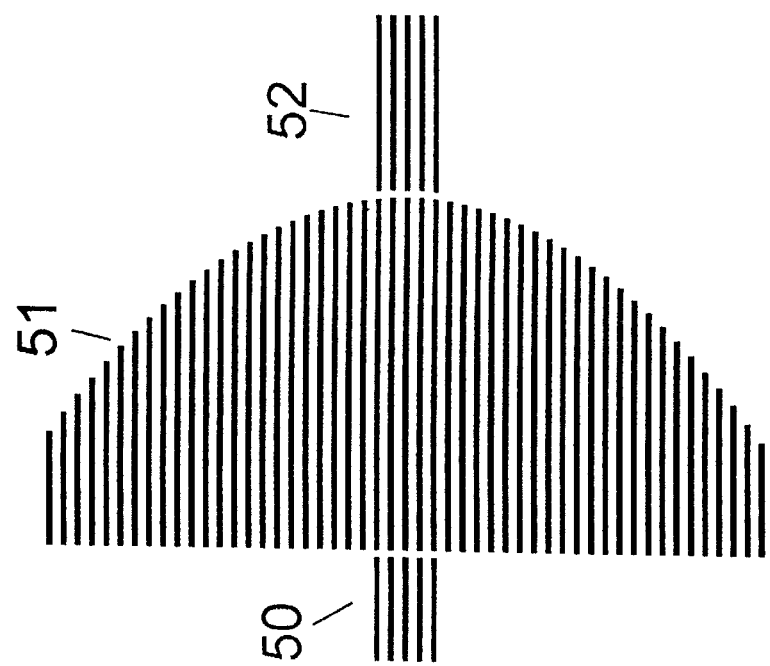
FIG. 3 is a histogram showing the relative lengths of the optical fibers used for a single stage optical commutator set in the array normal position.

The operation of the multi-stage optical commutator is best understood by referring first to FIG. 3. This shows a histogram representing the lengths of the stationary input fibers 50, the movable fibers 51 and the output stationary fibers 52. This figure shows the movable fibers having a parabolic distribution of lengths corresponding to the design for steering a flat antenna array. If the antenna were to be circular in nature, a cosine distribution would be employed. The output distribution of optical fibers 52 also has a parabolic distribution of lengths that is the inverse shape of the movable fiber set as described in my U.S. Pat. No. 5,347,288. In the position shown in FIG. 3, the optical path lengths through the three groups of optical fibers are all the same. Light passing through these fibers would experience the same path length and hence the same delay. When the movable set of fiber is moved relative to the two stationary set, the optical path lengths change. This is illustrated in FIG. 4. Here it can be seen that the path length changes linearly across the set. The more the movable set is moved from the center position of FIG. 3 the more is the variation in the path lengths. Optical signals entering the input fiber set will emerge from the output set with a time delay that varies linearly across the set. The time delay difference between one fiber and the next is adjustable by moving the movable set of fibers. This variation in time delay is the same as that required to steer the beam of a linear array of antenna elements.

The larger an antenna array becomes, the narrower the beam width becomes and hence the greater the precision needed to steer the beam. This means that the number of movable fibers, 51, can become very large for antennas requiring very precise steering. The number of movable fibers, T, is given by T=n+(N−1) where n is the number of antenna elements in a row on the array and N is the number of desired steering directions. As an example, the number of movable fibers in FIG. 3 is 51 and the number of element channels is 5, so this configuration can steer in 47 different directions, 51−5+1).

Figure 5:
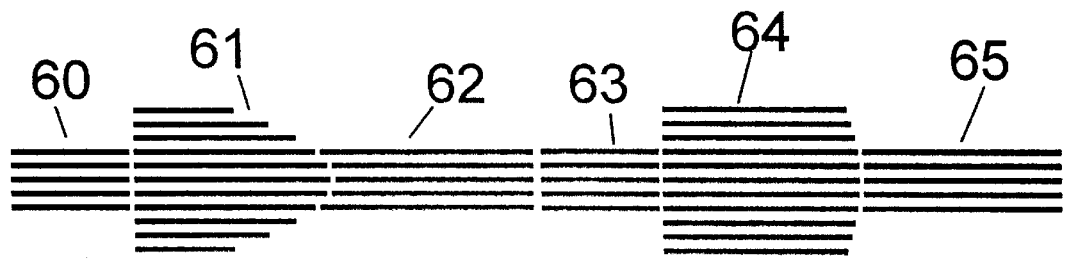
FIG. 5 is a histogram showing the relative lengths of the optical fibers used for a double stage optical commutator set in the array normal position.
Figure 6:
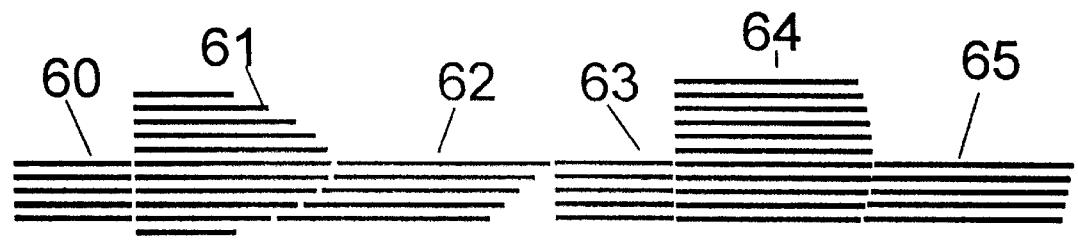
FIG. 6 is a histogram showing the relative lengths of the optical fibers used for a double stage optical commutator set in the steer right position.

The number of movable fibers can be reduced by placing two movable sets of fibers in series. The is illustrated in FIGS. 5 and 6. Stationary input fiber set 60 feeds movable set 61 having a parabolic or cosinusoidal distribution of lengths. Stationary output set 62 has a parabolic distribution of lengths. These are connected to stationary input set 63 of the second stage which in turn feed movable set 64. Set 64 has a parabolic or cosinusoidal distribution of lengths which has much less variation than set 61. Finally, stationary output set 65, having a parabolic distribution of lengths takes the output from the second movable set 64. FIG. 5 shows the alignment of the six sets of fibers in the center position and the optical path lengths through the parallel channels are all the same and will result in the same time delay. In this setting the antenna will steer in a direction that is perpendicular to the plane of the antenna array.

FIG. 6 shows the same sets of fibers as FIG. 5, but with the movable fiber sets displace from the center positions. The ends of fiber set 62 are stepped in the same fashion as FIG. 4. The ends of fibers 65 are also stepped, but with a finer step gradation. The combination of lengths given by sets 60 through 65 gives a variation in the lengths of the parallel paths that is dependent on the positions of the two movable sets 61 and 64. The numbers of movable fibers is given by T=2(n+√N−1). As an example, using the number of fibers shown in FIG. 6 for the two-stage case, the number of steerable directions is 49 and it employs 22 movable fibers. This can be compared with the single stage case of FIG. 3 that achieved 47 steerable directions and employs 51 movable fibers. For large antennas, the two stage commutator uses fewer movable optical fibers than the single stage case. For very large antennas, a three stage commutator could be employed to further save on the number of optical fibers that are needed to steer the array.

The fiber lengths have been depicted as straight lines in FIGS. 3 through 6 for the purposes of illustration and explanation. In practice, they will be coils and sets 62 and 63 would be combined into a single set.

It should be appreciated that any of the optical delay line sets may be replaced with other delay media having selected lengths for the various stages of the commutator. While the commutator has been described as having relative circular motion, it is also possible to use relative liner motion.

While certain preferred embodiments have been shown and described, it is distinctly understood that the invention is not limited thereto but may be otherwise embodied within the scope of the following claims:

What is claimed is:

1. A device for delaying signals coupled to elements of an array antenna, the device providing delay paths of selectable length between the respective elements and a first electronic unit, the device comprising:

a set of first fiber optic lines, each first fiber optic line having a first end, a second end wherein selected first fiber optic line first end is optically coupled to said first electronic unit;

a second set of second fiber optic lines, each second fiber optic line having a first end optically coupled to said second end of said set of first fiber optic lines and a second end and a first selected length which varies incrementally in sequence;

a set of third fiber optic lines, each third fiber optic line having a firs tend optically coupled to said second end of said second set of second fiber optic lines, a second end, and a second selected length;

a set of fourth fiber optic lines, each fourth fiber optic line having a first end optically coupled to said second end of said set of third fiber optic lines, a second end, and a selectable length which varies incrementally in sequence;

a set of fifth fiber optic lines, each fifth fiber optic line having a first end optically coupled to said second end of said set of fourth fiber optic lines, and a second end connected to a second electronic unit;

said second electronic unit connected to said elements of array antenna;

the set of second optical fibers being movable with respect to the set of first fiber optic lines and the set of third fiber optic lines; wherein one of said first optical lines, one of said second optical lines, and one of said third optical lines constitute a first section of one of said delay paths; and the set of fourth optical fibers being movable with respect to the third fiber optic lines and the set of fifth fiber optic lines, wherein said one of third optical lines in said first section of said delay paths, one of fourth optic lines and one of said fifth optical lines constitute a second section of one of said delay lines.

2. A device for delaying signals as described in claim 1, wherein said second set of optical fibers rotates concentrically with respect to said first set of optical fibers and said third set of optical fibers.

3. A device for delaying signals as described in claim 1, wherein said second set of optical fibers slides linearly with respect to said first set of optical fibers and said third set of optical fibers.

4. A device for delaying signals as described in claim 1, wherein said fourth set of optical fibers rotates concentrically with respect to said third set of optical fibers and said fifth set of optical fibers.

5. A device for delaying signals as described in claim 1, wherein said fourth set of optical fibers slides linearly with respect to said third set of optical fibers and said fifth set of optical fibers.

6. A device for delaying signals as described in claim 1, wherein said selected length in said second set is incremented sequentially more than said selected length in said fourth set.

7. A device for delaying signals as described in claim 6, wherein said selected length in said second set is incremented parabolically in sequence.

8. A device for delaying signals as described in claim 7, wherein said selected length in said fourth set is incremented parabolically.

9. A devide for delaying signals as described in claim 6, wherein said second set is incremented cosinusoidally.

10. A device for delaying signals as described in claim 9, where said fourth set is incremented cosinusoidally.

11. A device for delaying signals as described in claim 6, wherein said selected length in said third set has a parabolic distribution of length.

12. A device for delaying signals as described in claim 1, wherein at least one of said first set, said third set, and said fifth set has parabolic distribution in lengths.

13. A device for delaying signals as described in claim 1, wherein said first set, said third set, and said fifth set have constant distribution in lengths.

14. A device for delaying signals as described in claim 1, wherein each one of said optical fibers in said third set is split into more than one section.

15. A device for delaying signals as described in claim 1, wherein said first electronic unit is a frequency generating source, which actuates a light source to feed all of said first ends of said set of first fiber optic lines.

16. A device for delaying signals as described in claim 15, further comprising a photo diode and an amplifier connected between each said second end of said fifth set of fiber optic lines and one element of said antenna array.

17. A device for delaying signals coupled to elements of an array antenna, the device providing delay paths of selectable length between the respective elements and a second electronic unit, the device comprising:

a set of first fiber optic lines, each first fiber optic line having a first end, a second end wherein selected first fiber optic line first end is optically coupled to said electronic unit;

a second set of second fiber optic lines, each second fiber optic line having a first end optically coupled to said second of said set of first fiber optic lines, a second end and a first selected length which varies incrementally in sequence;

a set of third fiber optic lines, each third fiber optic line having a first end optically coupled to said said second end of said second set of second fiber optic lines, a second end, and a second selected length;

a set of fourth fiber optic lines, each fourth fiber optic line having a first end optically coupled to said second end of said set of third fiber optic lines, a second end, and a selectable length which varies incrementally in sequence;

a set of fifth fiber optic lines, each fifth fiber optic line having a first end optically coupled to said second end of said set of fourth fiber optic lines, and a second end connected to a first electronic unit;

said first electronic unit connected to said elements of array antenna;

the set of second optical fibers being movable with respect to the set of first fiber optic lines and the set of third fiber optic lines; wherein one of said first optical lines, one of said second optical lines, and one of said third optical lines constitute a first section of one of said delay paths; and the set of fourth optical fibers being movable with respect to the third fiber optic lines and the set of fifth fiber optic lines, wherein said one of third optical lines in said first section of said delay paths, one of fourth optical lines and one of said fifth optical lines constitute a second section of one of said delay lines.

18. A device for delaying signals as described in claim 17, wherein said second set of optical fibers rotates concentrically with respect to said first set of optical fibers and said third set of optical fibers.

19. A device for delaying signals as described in claim 17, wherein said second set of optical fibers slides linearly with respect to said first set of optical fibers and said third set of optical fibers.

20. A device for delaying signals as described in claim 17, wherein said fourth set of optical fibers rotates concentrically with respect to said third set of optical fibers and said fifth set of optical fibers.

21. A device for delaying signals as described in claim 17, wherein said fourth set of optical fibers slides linearly with respect to said third set of optical fiberss and said fifth set of optical fibers.

22. A device for delaying signals as described in claim 17, wherein said selected length in said second set is incremented sequentially more than said selected length in said fourth set.

23. A device for delaying signals as described in claim 22, wherein said selected length in said second set is incremented parabolically in sequence.

24. device for delaying signals as described in claim 23, wherein said selected length in said fourth set is incremented parabolically.

25. A device for delaying signals as described in claim 22, wherein said second set is incremented cosinusoidally.

26. A device for delaying signals as described in claim 25, where said fourth set is incremented cosinusoidally.

27. A device for delaying signals as described in claim 22, wherein said selected length in said third set has a parabolic distribution of length.

28. A device for delaying signals as described in claim 17, wherein at least one of said first set, said third set, and said fifth set has parabolic distribution in lengths.

29. A device for delaying signals as described in claim 17, wherein said first set, said third set, and said fifth set have constant distribution in lengths.

30. A device for delaying signals as described in claim 17, wherein each one of said optical fibers in said third set is split into more than one section.

31. A device for delaying signals as described in claim 17, wherein said first electronic unit is a signal processor, which actuates a group of light source to feed all of said first ends of said set of first fiber optic lines.

32. A device for delaying signals as described in claim 31, further comprising a photo diode and an amplifier connected between each said second end of said fifth set of fiber optic lines and one element of said antenna array.

33. A device for delaying signals as described in claim 17, wherein each of said first ends of said set of first optic lines is connected to a photo diode, which feeds a receiver.

34. A device for delaying signals as described in claim 17, further comprising an amplifier and a laser diode section connected between the second end of said set of fifth fiber optic lines and an element of said antenna array.

* * * * *